C. R. LIVERMON.
PEANUT THRESHING DEVICE.
APPLICATION FILED FEB. 16, 1912.
1,049,244.
Patented Dec. 31, 1912.
2 SHEETS—SHEET 1.
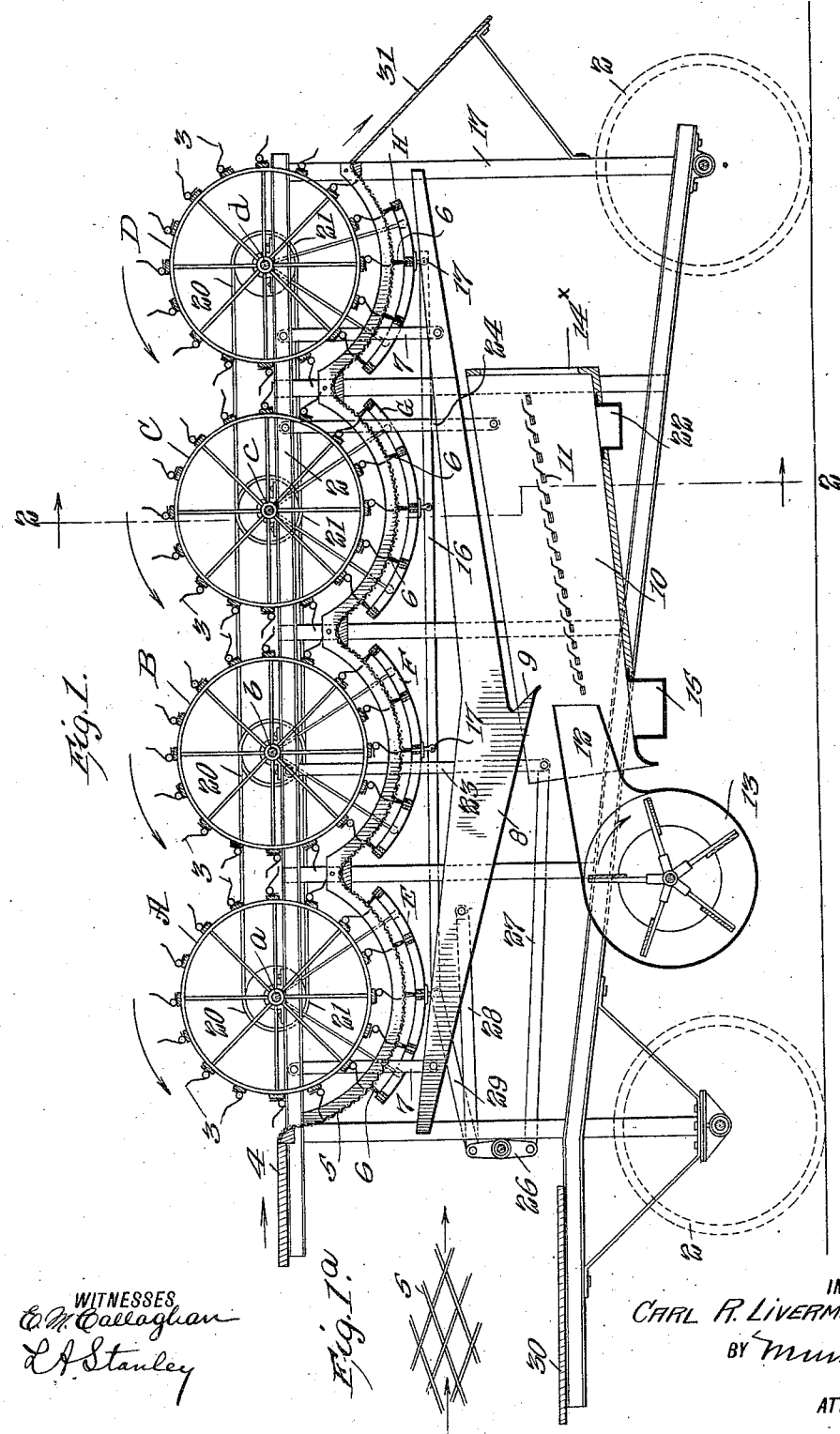
WITNESSES
INVENTOR
CARL R. LIVERMON
BY
ATTORNEYS

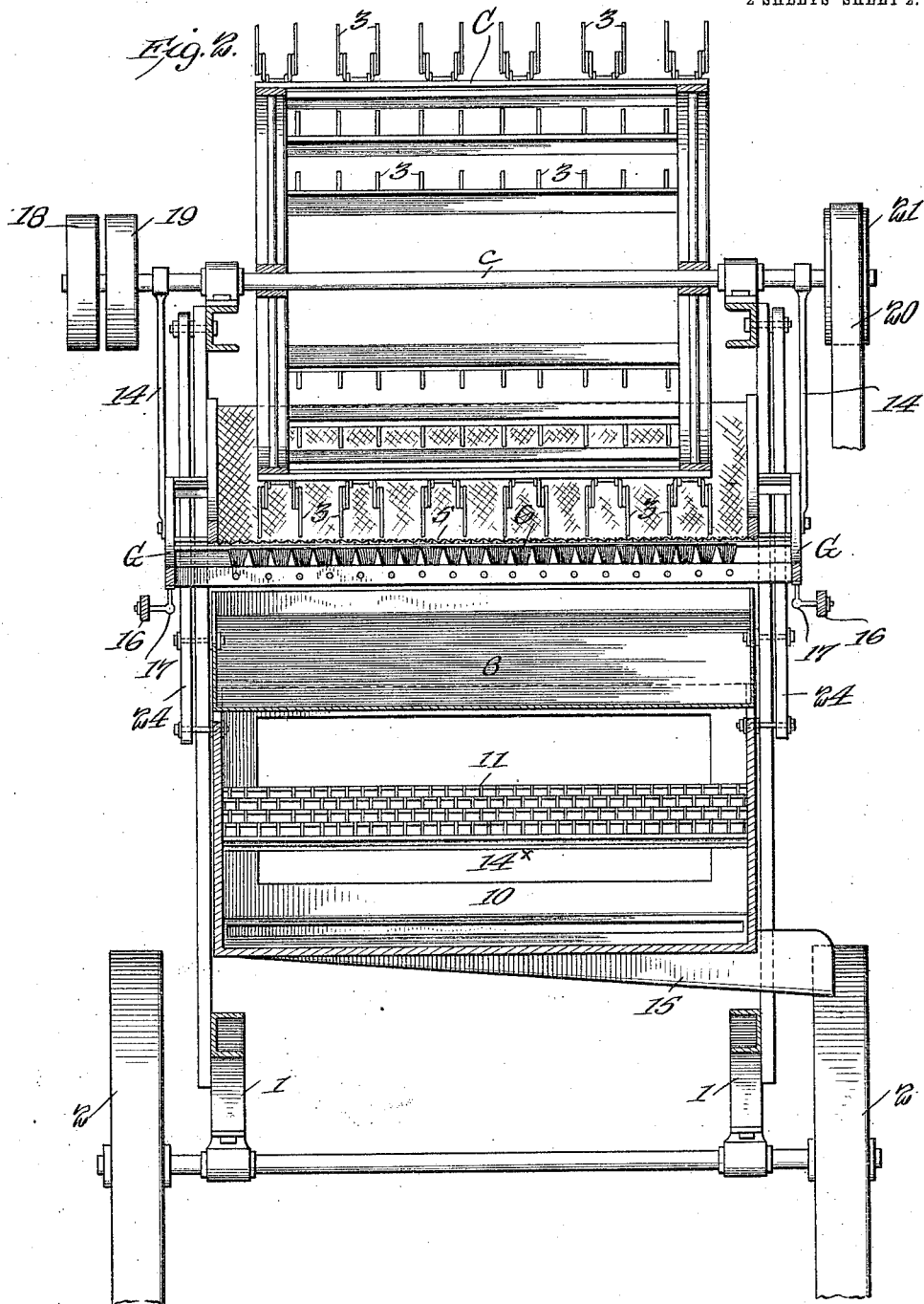

UNITED STATES PATENT OFFICE.

CARL R. LIVERMON, OF ROXOBEL, NORTH CAROLINA.

PEANUT-THRESHING DEVICE.

1,049,244.   Specification of Letters Patent.   Patented Dec. 31, 1912.

Application filed February 16, 1912. Serial No. 677,906.

*To all whom it may concern:*

Be it known that I, CARL R. LIVERMON, a citizen of the United States, and a resident of Roxobel, in the county of Bertie and State of North Carolina, have invented a new and useful Improvement in Peanut-Threshing Devices, of which the following is a specification.

My invention relates to improvements in peanut threshing devices, and it consists in the combinations, constructions and arrangements herein described and claimed.

An object of my invention is to provide means for separating the peanuts from the vines and for delivering the peanuts cleaned from chaff and dirt from one part of the machine and for discharging the vines from another part of the device.

A further object of my invention is to provide means for cleaning the separating device during the operation of the latter so as to prevent the clogging of the machine in the threshing operation.

A further object of my invention is to provide a threshing device with means for positively stripping the peanuts from the vines but without danger of crushing the peanuts.

Other objects and advantages will appear in the following specification, and the novel features of the device will be particularly pointed out in the appended claims.

My invention is illustrated in the accompanying drawings forming part of this application, in which—

Figure 1 is a central longitudinal section through the device, Fig. 1$^a$ is a detail view of a portion of the main screen; and Fig. 2 is a vertical section along the line 2—2 of Fig. 1 looking in the direction of the arrows.

In carrying out my invention I provide a main frame 1 mounted on wheels 2. This frame bears a series of drums such as those shown at A, B, C and D which are mounted transversely on the frame upon their respective axles $a$, $b$, $c$, and $d$. Each of the drums is provided on its exterior with a series of spring fingers 3 of the form shown in Fig. 2, these fingers being preferably arranged in pairs.

At one end of the frame 1 is a table 4 upon which the peanut vines are placed preparatory to feeding them to the drums. Extending underneath the drums is a continuous screen 5 which forms a series of curves, each curve being concentric with the axis of its particular drum. These screens are so located as to just clear the spring fingers 3. Under each screen is an arc-shaped frame such as those shown at E, F, G, and H which are provided with brushes 6, the ends of these brushes being in engagement with the bottom of the screen.

Suspended from the upper part of the frame 1 by means of the links or arms 7 is a V-shaped chute 8, one side of the chute being inclined at a greater angle than the other to provide a discharge opening 9 near the center of the device. The discharge opening 9 communicates with the interior of an air passage 10 in which is located a screen 11. At one end of this air passage is the mouth 12 of a fan or blower 13, the other end being open as shown at 14$^x$. At 15 is the discharge chute for the peanuts which is inclined to one side as shown in Fig. 2 so as to permit the peanuts to be delivered after being threshed.

The brush frames E, F, G and H are suspended from the axles of the drums by means of links 14. In Fig. 2, only the frame G is shown, but the others are similarly suspended. The frames are actuated by means of rods 16 extending along the sides of the machine and being connected with the frames at 17, as clearly shown in Fig. 1.

The driving pulleys 18 and 19 are disposed on one of the axles such as small $c$, (see Fig. 2), and the other drums are driven by means of belts 20 passing over pulleys 21 in such a manner as to turn all of the drums in the same direction. The conduit 10 and the discharge chute 15, together with a discharge chute 22 for dust or dirt are suspended by means of links 23 and 24, these links being so positioned as to permit a movement of the frame which forms the conduit. The driving mechanism for actuating the conduit 10, the chute 8, and the brush frames E, F, G and H consists of a rocking lever 26, one end of which is connected to the conduit frame 10 by means of a link 27, the other end being connected by means of the link 28 to the suspended chute 8 and by means of the link 29 to the rod 16 which is common to the brush frames.

From the foregoing description of the various parts of the device the operation thereof may be readily understood. The operator takes his stand on a platform 30 and feeds the vines with the peanuts attached, forwardly, where they are caught up by the spring fingers 3 of the first drum A and carried downwardly and forwardly over the first curved section of the screen 5. This screen is of large enough mesh to permit the entrance of the peanuts, and, as shown in Fig. 1ª, is preferably of diamond shaped mesh, the acute angles of the diamond being in the direction of travel of the vines. The purpose of this construction is readily seen, for as the peanuts go through the screen they are drawn forward into the acute angle and are thereby torn from the vines, whereupon they tend to fall into the chute 8. It is obvious that all of the peanuts will not be separated from the vines at the first screen section, and for this reason I provide more than one drum and screen section. It will be understood that the rocking lever 26 is actuated by any suitable mechanism (not shown) so as to cause the oscillation of the brush frames E, F, G and H. The brushes 6 which are in contact with the lower part of the screen 5, tend to dislodge any of the peanuts which are caught in the screen, and also to keep the screen clear of particles of the vine itself, thereby giving the peanuts a good chance to fall through the screen upon the peanut chute 8. The latter is oscillated by means of the link 28 which is connected with the rocking lever 26. The peanuts pass down through the opening 9 upon the screen 11 which is also oscillating through the movement of the link 27. Here they gravitate toward the blower or fan 13, and the lighter parts of the chaff or dirt is blown out through the passage or conduit 10 and through the opening 14. The heavier part of the dirt collects in the chute 22 while the peanuts themselves fall into the chute 15 and are delivered from the side of the machine in a perfectly clean condition. The vines are passed on from drum to drum and are discharged upon the tail board 31.

The purpose of the spring fingers is to pull the vines forwardly without breaking or injuring the peanuts. When a peanut is caught in the screen the spring finger will ride over it and the movement of the brush underneath the screen will dislodge the peanut, whereupon it will fall into the chute 8.

I am aware that other forms of the device based on the same principle might be made, but I consider as my own all such modifications as fairly fall within the spirit and scope of the invention.

I claim:

1. In a peanut threshing device, a frame, drums carried thereby, a perforated concave for each drum, spring fingers carried by the periphery of the drum and arranged to engage the upper surface of the concave, brushes disposed beneath the concave and arranged to engage the latter, and means for reciprocating the brushes in a path concentric to the perforated concave.

2. In a peanut threshing device, a frame, drums carried thereby, a perforated concave for each drum, spring fingers carried by the periphery of the drum and arranged to engage the upper surface of the concave, brushes disposed beneath the concave and arranged to engage the latter, a frame concentric with the perforated concave, a series of brushes carried by said frame and arranged to engage the concave, said frame being mounted on an axis coincident with that of the drum, and means for reciprocating the frame.

3. In a peanut threshing device, a frame, drums carried thereby, a perforated concave for each drum, spring fingers carried by the periphery of the drum and arranged to engage the upper surface of the concave, brushes disposed beneath the concave and arranged to engage the latter, a frame concentric with the perforated concave, a series of brushes carried by said frame, and arranged to engage the concave, said frame being mounted on an axis coincident with that of the drum, means for reciprocating the frame, said reciprocating means comprising a rod pivotally connected to each of said concentric frames, and means for reciprocating the rod.

4. In a peanut threshing device, a series of drums, each drum being provided with spring fingers on its periphery, a perforated concave for each drum, each of said perforations having a diamond shape, the greater length of the diamond being disposed transversely to the axis of the drum, a concentric frame being pivotally disposed beneath each concave, the pivots of the concentric frames coinciding with the axes of three individual drums, and means for reciprocating the concentric frames simultaneously.

5. In a peanut threshing device, a series of drums, each drum being provided with spring fingers on its periphery, a perfoated concave for each drum, each of said perforations having a diamond shape, the greater length of the diamond being disposed transversely to the axis of the drum, a concentric frame being pivotally disposed beneath each concave, the pivots of the concentric frames coinciding with the axes of three individual drums, means for reciprocating the concentric frames simultaneously, and in the same direction, said means comprising a rod suspended from the frame of the machine, and means for reciprocating the rod.

CARL R. LIVERMON.

Witnesses:
JACOB M. JACOBS,
RUPERT W. JILCOTT.

Copies of this patent may be obtained for five cents each, by addressing the "Commissioner of Patents, Washington, D. C."